Patented Apr. 22, 1930

1,755,496

UNITED STATES PATENT OFFICE

ABRAHAM SIDNEY BEHRMAN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS

PROCESS OF PREPARING SILICEOUS MATERIALS

No Drawing. Application filed July 29, 1925. Serial No. 46,890.

This invention relates to the production of siliceous materials and provides a method of preparing the same whereby the properties of the materials produced are materially improved.

Various methods have been proposed for the production of adsorbents, catalysts and water softening agents utilizing silica or compounds of silica. In the case of adsorbents, a substantially pure silica, more or less hydrated, will meet the requirements of a number of purification processes. In the manufacture of zeolite water softening materials by the wet or precipitation method, double silicates of aluminum or an equivalent metal and of sodium or an equivalent alkali metal are prepared. In the production of catalysts the silica is combined with various metal oxides.

In the preparation of the several materials referred to, the common practice has been to derive the silica from alkaline solutions containing the same, the most widely used of these being sodium silicate in the form generally referred to as commercial water glass.

In producing the more or less well known silica gels which are used primarily for adsorbent purposes, the sodium of the sodium silicate is neutralized by combining with it the correct or exact amount of acid required for that purpose, the salts thus formed are washed out and the residue completely dried at comparatively high temperatures between 300° and 400° C., producing a hard transparent substance resembling glass in appearance and having considerable adsorptive properties.

Other methods for the preparation of adsorbents have been proposed, such as the formation of a gel of silica and heavy metal oxide, from which the latter is removed by treatment with an acid and water, the theory being that removal of the oxide results in additional porosity.

All prior practice has involved preciseness of proportioning, strict observance of times and temperatures of treatment and careful handling of the product in its various stages of completion, thus requiring laboratory methods of preparation and resulting in an excessive cost of production and an inordinately high market price for the materials.

One of the principal objects of the present invention is to provide an improved method of obtaining siliceous materials from solution and of converting the same into products adapted for industrial use.

A further object of the invention is to provide a method for the production of siliceous materials having greater capacity for certain puropses than the material produced by prior methods.

A still further object is the provision of a method for the preparation of siliceous materials which is far more simple than any of the prior methods, which involves less time for treatment, less in the way of equipment, less attention and supervision, but nevertheless produces a superior final product with better assurance of success than heretofore.

In the practice of the present invention the customary method of neutralizing the alkali in a solution of sodium silicate to produce a gel directly, is departed from, and instead, the silicic acid is retained in solution after treatment with the acid and gelation is accomplished by a subsequent step.

In a preferred method of carrying out the invention, a solution of sodium silicate is mixed with a sufficient excess of acid so that the silicic acid liberated will remain in colloidal solution.

The next step is to cause a gel to form, which is accomplished by making the solution alkaline, preferably with ammonium hydroxide. Other alkaline reagents such as sodium hydroxide carbonate or bi-carbonate may be employed for this purpose but I prefer to use ammonium hydroxide because it is a weak base, its addition in excess does no harm, and therefore exactitude as to the quantity added is not required. The gel so formed, after being dried and leached, has excellent adsorbent properties.

If it is desired to prepare a gel consisting of silica together with one or more metallic oxides (or hydroxides)—particularly of the heavy metals—the colloidal solution of silicic acid is prepared as above. To it is added the solution of a salt of the desired metal or metals, such as iron, aluminum, chromium, nickel, etc. The acidity of the combined solutions—which may now, in a sense, be regarded as the solution of a metallo-silicic acid—is then neutralized, whereupon a gel is formed. For this neutralization, I prefer as before ammonium hydroxide, though other alkaline compounds may be employed.

Again, if it is desired to prepare a base-exchange silicate by this method, I prepare as before a colloidal solution of silicic acid, and add to it the solution of a salt of a suitable metal. For this purpose I prefer the salt of aluminum, or of an equivalent metal such as iron, chromium, etc. The combined solutions I now mix with an alkaline solution of an alkali metal, such as a solution of sodium hydroxide, carbonate, or bicarbonate. The quantity of alkaline solution employed depends upon the proportion of alkali metal oxide desired in the end product.

As in my former Patent No. 1,515,007 of November 11, 1924, I prefer in all cases to employ the solutions in such proportions, degrees of concentration, and to work at temperatures which will result in a gel embracing the entire reaction volume. The gel may be dried to remove all moisture, etc., or it may be dried until hard, when it may be leached of soluble salts before final drying, depending upon the nature of the product and degree of adsorption desired.

It is characteristic of all dried gels of this nature to granulate into small particles when wetted with water.

It is not necessary, however, to form a gel of the nature just described. Under certain conditions, as by the use of dilute solutions, a gelatinous precipitate is formed from which more or less of the mother liquor separates or is separated before drying and further processing. In this case the final product is also superior to those resulting from prior methods of procedure.

Having outlined the underlying thought of the invention, I shall now cite in detail three examples of procedure in accordance with what I consider to be the best manner of applying the invention.

In the preparation of a simple silica gel, I dilute 41.5 kg. commercial sodium silicate (40° Baumé), containing about 9% $Na_2O$ and 27.5% $SiO_2$, with water to a volume of 150 liters. This I now mix with 24 liters of sulphuric acid containing 305 grams $H_2SO_4$ per liter. The mixing may be accomplished in any suitable manner, provided an excess of the acid is present at all times to prevent precipitation. The silicate solution may be added slowly to the acid solution, with constant stirring, or streams of the two solutions, properly proportioned, may be caused to flow together. A colloidal solution of silicic acid is thus formed. With this solution I now mix 100 liters of an ammonium hydroxide solution containing about 15 grams $NH_3$ per liter. The mixing is preferably accomplished by introducing the solutions, or successive portions thereof, simultaneously to a third receptacle and agitating. In less than a minute a homogeneous gel is formed, embracing the entire reaction volume. This gel rapidly sets to a very stiff and firm mass which is then dried in any well known manner. Or, while the mixture is still fluid, it may be subjected to spray drying, film drying, or any other method especially suited for the purpose.

In general, the slower such a gel is dried, the greater will be its porosity, and the less its weight per unit volume. The method and time of drying is therefore varied in accordance with the product desired.

For the preparation of a gel containing silica together with a metallic oxide, I dilute 27.6 kg. commercial 40° Bé. water glass to 100 liters, and mix this solution with 15 liters of sulphuric acid containing about 340 grams $H_2SO_4$ per liter. To the colloidal solution of silicic acid thus obtained I add 50 liters of ferrous sulphate solution containing 56 grams $FeSO_4.7H_2O$ per liter. I now mix these combined solutions with 65 liters ammonium hydroxide containing about 30 grams $NH_3$ per liter. A gel is formed which embraces all of the reaction volume. The gel may then be dried by any suitable method. If dried in an oxidizing atmosphere, the original blue color of the gel changes to brown. If oxygen is excluded, the gel may be dried to a deep blue mass.

In the preparation of a base exchange material according to the method of the present invention, I dilute 27.6 kg. commercial 40° Bé. sodium silicate to 100 liters, and mix this solution with 25 liters of sulphuric acid containing about 225 grams $H_2SO_4$ per liter. To the colloidal solution of silicic acid thus obtained I add 25 liters of aluminum sulphate containing 180 grams $Al_2(SO_4)_3 \cdot 18H_2O$ per liter. I now mix these combined solutions with 150 liters sodium hydroxide solution containing about 23.3 grams NaOH per liter. A homogeneous gel forms, which I prefer to dry to remove all moisture at a temperature preferably not over 100° C. When thus dried, washed, and again dried, the material weighs about 50 pounds per cubic foot, and has a base exchange capacity of about 200 grains calcium carbonate equivalent per pound.

Useful and desirable products may be produced both from mixtures alkaline to phenolphthalein, and from mixtures neutral to phenolphthalein but alkaline to methyl orange.

If it is desired to employ as adsorbents any of the materials prepared according to this invention, the usual methods of activation and reactivation may be utilized. As illustrative of the improvement in the products resulting from the process of this invention I will mention that if, for example, the simple silica gel described in the first example, after being freed of soluble salts, is slowly heated to about 150° C., and cooled in a receptacle protected from the air, it will be found to have a very high capacity for adsorbing the vapors of many of the solvents used in the industries. At 25° C. and at normal atmospheric pressures, it will adsorb from dry air saturated with carbon tetrachloride at 25° C. about 112% of its weight of the latter, whereas under the same conditions the silica gel prepared according to the most widely known process of the prior art will adsorb only about 58% of its weight.

In the adsorption of petroleum ether, under the conditions just described, the prior art product has a capacity of about 25% of its weight, while my improved product will adsorb 47%.

In ethyl ether, the former product has about 32% capacity while mine has about 55%, and in ethyl acetate adsorption the capacities are respectively 36% and 66%.

Many variations of the procedure here proposed for the practice of the invention will suggest themselves to those skilled in the art. It occurs to me at present that in all of the cases cited, the amount of acid employed may be largely increased as a convenient means of furnishing, on subsequent neutralization, a larger quantity of soluble salts which will increase the porosity of the final product. Also that soluble salts may be added directly for the same purpose, and that the amount of ammonium hydroxide employed may be largely in excess of that required for neutralization in order further to increase porosity. Furthermore, while I prefer to use a solution of ammonium hydroxide in the manner described, the step of gelation may be accomplished by exposing the colloidal solution of silicic acid to the action of ammonia gas, the solution being exposed either en masse, or by spray drying or film drying in an atmosphere of ammonia, or by other suitable means In the second and third types of products described, different proportions of the reagents may be employed, to yield products of different composition. Mixtures of salts of different metals may be used. The materials so prepared may be treated with the solution of an acid to dissolve out the heavy metal oxides, or alkali metal oxides, or both. If it is desired to reduce the heavy metal oxide to the metal, in order to make the materials more suitable for catalytic or contact purposes, the reduction may be accomplished by any suitable method.

I claim:

1. The process of preparing siliceous materials which comprises the gelation of the silica from a colloidal solution of silicic acid in an acid medium by treatment with an alkaline solution.

2. In the process of preparing siliceous materials the step of neutralizing a colloidal solution of silicic acid in an acid medium with ammonium hydroxide 3. In the process of preparing siliceous materials the steps of forming a colloidal solution of silicic acid by mixing a solution of sodium silicate with more than enough acid to neutralize the alkalinity therein, and then combining with the solution of silicic acid an alkaline solution to neutralize the same.

4. In the process of preparing siliceous materials the steps of forming a colloidal solution of silicic acid mixing a solution of sodium silicate with more than enough acid to neutralize the alkalinity therein, and then combining with the solution of silicic acid a quantity of ammonium hydroxide sufficient at least to neutralize the same.

5. The process of preparing siliceous materials which comprises treating a solution of sodium silicate with an excess of acid to form a colloidal solution of silicic acid and then neutralizing the latter by treatment with an alkaline solution, the several solutions to be so proportioned and in such degrees of concentration that the resulting gel will embrace substantially the entire volume of the reaction mixture.

6. The process of preparing siliceous materials which comprises mixing a colloidal solution of silicic acid with a solution of a metallic salt, then mixing with an alkaline solution to form a gel embracing the silica and a metal oxide.

7. The process of preparing siliceous materials which comprises mixing a colloidal solution of silicic acid with a salt of a metal, then mixing with an alkaline hydroxide to form a gel embracing silica and a metal oxide, and drying the gel.

8. A process of preparing siliceous materials which comprises preparing an acidic colloidal solution of silicic acid and then treating this solution with an alkaline reagent until it becomes alkaline to phenolphthalein.

9. A process of preparing siliceous materials which comprises preparing an acidic colloidal solution of silicic acid and then treating this solution with an alkaline reagent until it becomes alkaline to methyl orange.

10. A process of improving siliceous gels produced by the alkalinization of colloidal solutions of silicic acid, which comprises adding an excess of acid to the silicic acid solution and subsequently neutralizing such excess.

11. A process of preparing siliceous materials which comprises forming a colloidal solution of silicic acid in an acid medium and then neutralizing.

12. The process of claim 11 in which metallic components are incorporated in said colloidal solution before neutralization.

13. A process of improving siliceous gels which comprises the gelation of a silicic acid solution to embrace substantially all of the reaction mixture, the provision of an excess of acid in said reaction and the neutralization of said excess of acid before and during said gelation.

14. A process of improving siliceous gels which comprises the gelation of a silicic acid solution to embrace substantially all of the reaction mixture, the provision of an excess of sulphuric acid in said reaction mixture and the neutralization of said excess of acid before and during said gelation by an alkali metal hydroxide.

In testimony whereof I have hereunto subscribed my name.

ABRAHAM SIDNEY BEHRMAN.